April 29, 1941.   R. L. KREIDER   2,240,336
DENTAL X-RAY FILM HOLDER
Filed Aug. 14, 1940

INVENTOR.
Raymond L. Kreider
BY
Florian G. Miller
ATTORNEY.

Patented Apr. 29, 1941

2,240,336

UNITED STATES PATENT OFFICE 2,240,336

DENTAL X-RAY FILM HOLDER

Raymond L. Kreider, Erie, Pa.

Application August 14, 1940, Serial No. 352,531

1 Claim. (Cl. 250—70)

This invention relates generally to dental X-ray film holders and more particularly to holders which are gripped and held in place by the teeth of the patient.

This application is a continuation in part of Raymond L. Kreider's application, Serial No. 243,209.

All devices of this character made according to the teachings of the prior art and with which I am familiar, have been made of materials which caused a certain amount of clouding or fogging of the film because of the radiopacity of materials used in the manufacture of the holders. Some of the X-ray film holders have been found to be injurious to the mouth tissues because of projecting sharp edges. All dental X-ray film holders now in use cast a shadow on the film, thereby making the picture less valuable, since the study of X-ray film is a study of shadows of the object X-rayed. Secondary radiation caused by materials used in manufacturing these prior film holders have caused clouding and fogging of the film. Where pockets have been provided for holding X-ray films, they have proven unsatisfactory because dirt clogs the film and the film pocket is inserted and retrieved from the pocket with great difficulty. Material in these holders likewise causes clouding and fogging of the film.

It is, accordingly, an object of my invention to overcome the above and other defects in dental X-ray film holders and it is more particularly an object of my invention to provide a dental X-ray film holder adapted to be gripped between the teeth of the patient which is cheap in cost, flexible in structure, and easy to manufacture.

Another object of my invention is to provide a dental X-ray film holder which presents no secondary radiation when X-rays pass therethrough thereby providing clear X-ray film.

Another object of my invention is to provide a dental X-ray film holder which has simple means for holding the film and which may be used for X-raying any tooth in the mouth.

Another object of my invention is to provide a dental X-ray film holder which may be used and sterilized indefinitely and which is non-toxic.

Another object of my invention is to provide a dental X-ray film holder manufactured of materials which eliminate secondary radiation.

Another object of my invention is to provide a dental film holder of rubber which is soft in texture.

Other objects of my invention will become evident from the following detailed description, taken in conjunction with the accompanying drawing, in which Fig. 1 is a fragmentary side elevational view in cross-section of my novel dental X-ray film holder gripped in place between the teeth.

Figure 1:
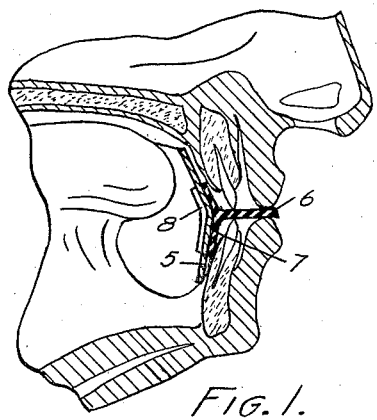
Figure 2:
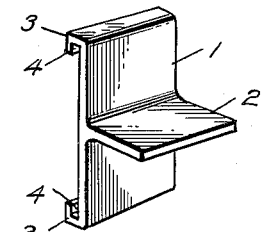
Fig. 2 is a perspective view of my novel dental X-ray film holder.
Figure 3:
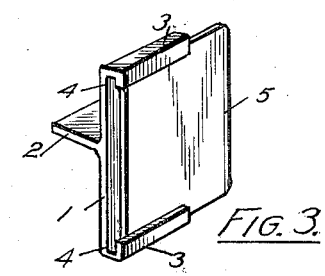
Fig. 3 is a perspective view of my novel X-ray film holder with the film partly removed from the holder.
Figure 4:
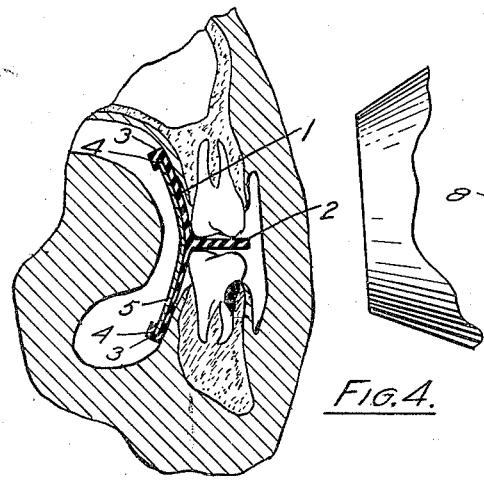
Fig. 4 is a fragmentary side elevational view in cross-section showing my novel X-ray film holder gripped between the posterior teeth.
Figure 5:
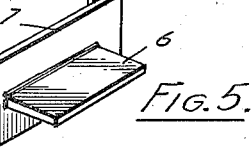
Fig. 5 is a perspective view of my novel dental X-ray film holder for X-raying anterior teeth as shown in Fig. 1.
Figure 6:
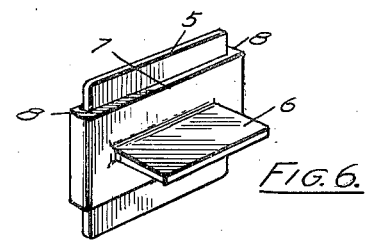
Fig. 6 is a perspective view of the film holder shown in Fig. 5 with the film disposed in the holder.

Referring to the drawing, Figs. 1 and 2 show a flat member 1 having a laterally extending bite tab 2 adapted to be gripped between the teeth as shown in Figs. 1 and 4 to hold the X-ray film holder in place adjacent the lingual surface of the teeth in order that a clear X-ray film of the crowns of the upper and lower teeth may be produced. The flat member 1 has flanges 3 disposed on opposite ends thereof which form grooves 4 for receiving any standard film packet 5 (Fig. 3) now on the market. Where it is desired to X-ray the anterior teeth as shown in Fig. 1, the bite tabe 6 is disposed lengthwise of the flat member 7 and the flanges 8 are disposed on the sides of the flat member so that the X-ray film may be disposed in a horizontal position as shown in Fig. 1.

To overcome the radiopacity of the dental X-ray film holder and therefore the secondary radiation, I manufacture the film holders from the following ingredients in the approximate proportions by weight as follows:

| | Per cent |
|---|---|
| Pure gum rubber | 95 |
| Sulphur | 2½ |
| Trimene Base | 2½ |

The Trimene Base set forth above is an aldehyde-amine reaction product and anti-oxidant as well as non-toxic. By the use of a mixture of the above ingredients in the approximate proportions stated, I have found that no secondary radiation is produced and radiolucense is obtained. This is so even in the tab portion of the film in line with the horizontal tab portion of the flat member 1 which has heretofore caused the greatest difficulty in the fogging of X-ray films. The aldehyde in the Trimene Base is formaldehyde. The amine is an aliphatic amine. It is a complex reaction product of an aldehyde and an aliphatic amine, the aldehyde involved being a formaldehyde.

It will be evident that I have provided a dental X-ray film holder which may be used indefinitely, which may be sterilized, and which permits the production of a completed film free from shows and cloudiness.

Various changes may be made in the specific embodiment of the present invention without departing from the spirit thereof, or from the scope of the appended claim.

What I claim is:

A dental X-ray film holder free from secondary radiation comprising a mixture of ingredients in the following approximate proportions and weight:

| | Per cent |
|---|---|
| Pure gum rubber | 95 |
| Sulphur | 2½ |
| A reaction product of a formaldehyde and an aliphatic amine | 2½ |

RAYMOND L. KREIDER.